United States Patent

[11] 3,532,143

| | | |
|---|---|---|
| [72] | Inventor | H. V. Williams<br>Frankfurt am Main, Germany |
| [21] | Appl. No. | 654,622 |
| [22] | Filed | July 19, 1967 |
| [45] | Patented | Oct. 6, 1970 |
| [73] | Assignee | Innovation International, Inc.<br>c/o Borenstein and Griffin, Chicago, Illinois<br>a corporation of Illinois |

[54] EGG HANDLING MACHINE
5 Claims, 4 Drawing Figs.

[52] U.S. Cl. .................................................. 146/2
[51] Int. Cl. .................................................. A47j 43/14
[50] Field of Search .......................................... 146/2, 2.3, 2.4

[56] References Cited
UNITED STATES PATENTS

| | | | |
|---|---|---|---|
| 2,443,188 | 6/1948 | Hodson .................. | 146/2 |
| 2,771,926 | 11/1956 | Willsey .................. | 146/2 |

Primary Examiner—W. Graydon Abercrombie
Attorney—Anderson, Luedeka, Fitch, Even and Tabin

ABSTRACT: An egg handling machine for automatically cracking eggs and separating whites and yolks therein including means for delivering the eggs, a plurality of opposed pairs of egg holders for receiving the eggs from the delivery means, means for cracking the egg, means for causing the egg holders to travel in a first generally parallel path, then in an obliquely divergent path and then in a second generally parallel path, and means for receiving and separating the contents of the eggs.

Patented Oct. 6, 1970

INVENTOR
H. V. WILLIAMS

BY Anderson, Luedeka, Fitch, Even, & Tabin ATTYS.

EGG HANDLING MACHINE

This invention relates to an egg handling machine for automatically cracking eggs including an automatic egg feed and discharge means, separation means for the yolks and whites, and several egg vacuum holding pairs operating in the opposite direction of rotation.

According to the prior art a machine is known where one holding pair in each case seizes one egg, holds it during the separation operation, and then ejects the shell halves, while the contents of the egg drop into the egg discharge apparatus. The principal phases of the processing operation, the separation and opening, are thereby carried out substantially at one location of the machine. The production output of the machine is low, so that it operates uneconomically.

Furthermore, an egg preparation machine is known where a multiplicity of eggs are clamped consecutively between vacuum holder pairs. By means of a separation device operating in the opposite direction each egg shell is divided all the way around into two shell halves. In order to operate safely the machine must be fed with eggs in presorted sizes, and its design is very complicated. The separation and opening are likewise carried out substantially at one processing location.

The problem of this invention consists in creating a machine for the preparation of eggs where with simple and operationally dependable design a very high production output is obtained, and which can be applied for all egg sizes within the frame of the usual dimensions.

According to the invention this problem is solved in such a manner that the egg vacuum holding pairs operate over several processing phases synchronously, parallel and in the same direction with the egg removal device. The resulting advantage being that the essential processing operations can take place simultaneously at several held eggs, which translates itself into a high productive capacity.

According to another feature of the invention the egg vacuum holders located opposite each other of each pair flare along a first parallel guide track located in the range of the separation device into a second parallel guide track, which exerts a particularly advantageous and neat opening effect upon the egg and the contents of the egg can thus drop immediately into the egg removal device.

The egg vacuum holders of each pair located opposite each other and supplied with eggs are, according to an additional feature of the invention partly rotatable around their longitudinal axis during the first parallel guiding. This rotation also improves the opening effect further in a simple manner.

According to another characteristic of the invention the egg vacuum holders are under suction effect during the first parallel guiding of the flaring guide and during the second parallel guiding. As a result of this suction effect is held during the separation and opening operation in an advantageous manner, yet it is held well and yet damage-free, so that it is possible to operate at a high speed.

According to another feature of the invention the suction effect can be controlled by one valve element each. The operating medium, preferably air, thus offers the holding function of the egg in question in a simple manner and can be controlled easily in line with the requirements with the aid of the valve element.

According to another feature of the invention compressed air nozzles are located above the egg vacuum holders oriented toward the center of the egg in the area of the second parallel guide. These compressed air nozzles bring about a quick, clean and thorough emptying of the shell halves of the egg, freeing them of their egg contents.

According to another feature of the invention the valve elements and the compressed air nozzles may be connected to a vacuum pump which in an advantageous manner results in a simplification of the machine.

According to another feature of the invention the movements of the egg feed and discharge device, of the egg vacuum holding pairs, of the separation device and of the valve elements can be controlled from a main shaft. Thus there is a joint drive and all movements are positive. precisely synchronized with regard to each other.

Additional features result from the specification and drawing.

Below the invention is described in detail by means of an embodiment shown in the drawing. In the drawing.

Figure 1:
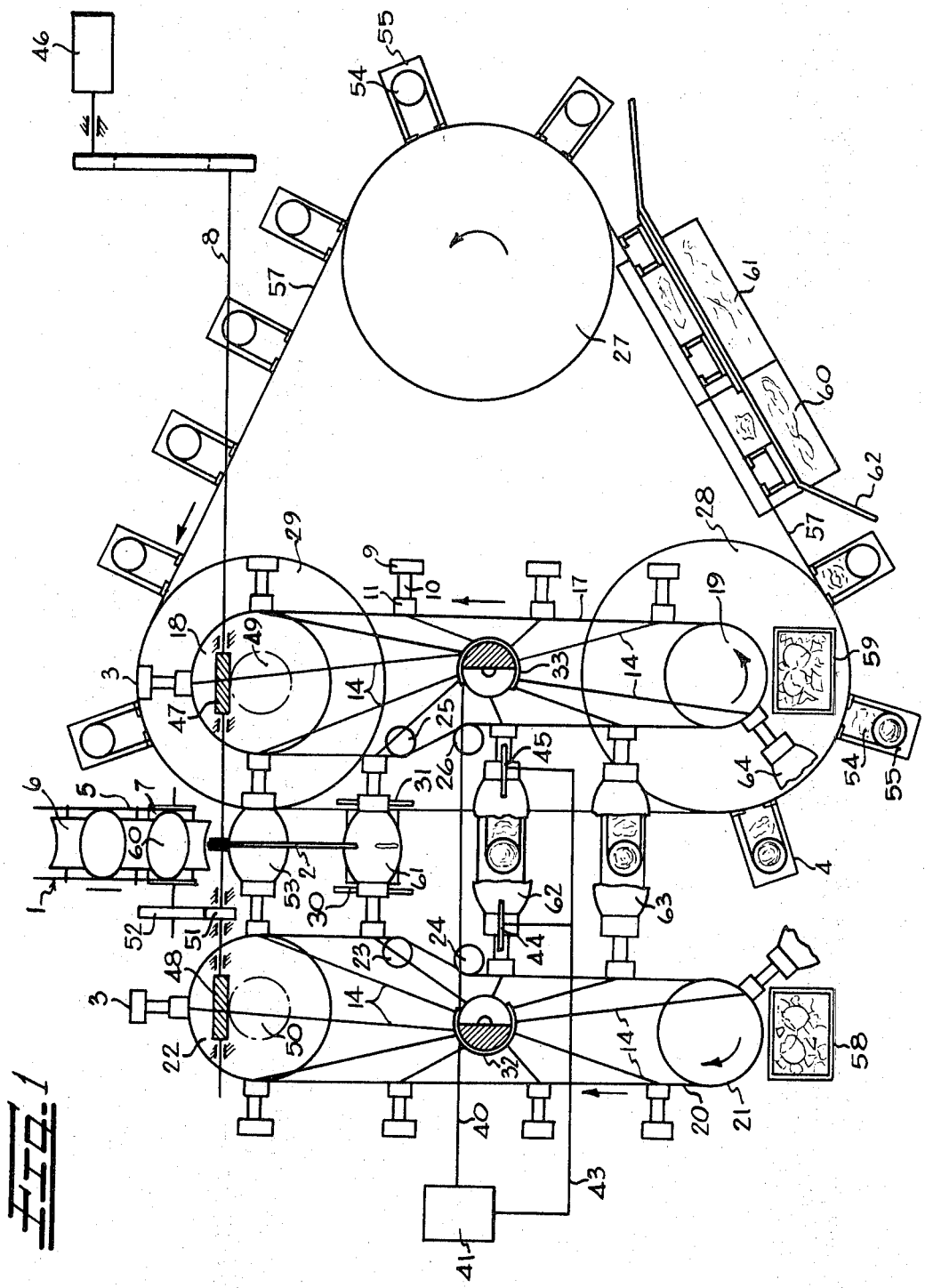
FIG. 1 shows a schematic overall view of the machine according to the invention in a plan view.

The machine for the preparation of eggs according to FIG. 1 comprises the following principal components: egg feed device 1, separation means 2, vacuum holders 3 and egg removal means 4.

The egg feeding device 1 comprises thereby a conveyor chain 5 with arched conveyor rollers 6 fastened thereto. Conveyor chain and conveyor rollers rotate endlessly and are reversed on the side facing away from the vacuum rollers of the egg preparation machine by a reversing roller 7. The shape and position of the conveyor rollers 6 is such that one egg can be accommodated between two conveyor rollers damage-free and be conveyed to the machine.

The separation means 2 of the machine for the preparation of eggs comprises a knife and a drive element for the knife (not shown in detail). The knife may be either a percussion knife with a straight blade, a curved blade or a sawtooth blade, or the knife may be designed as a rotating part like a circular saw. A curved disk or an articulated mechanism in the form of a gear with four articulations is used as the propulsion element, with the aid of which the rotating drive motion can be converted into a back and forth propulsion movement for the knife. The drive section is fixedly connected with the principal shaft 8 of the machine.

Figure 2:
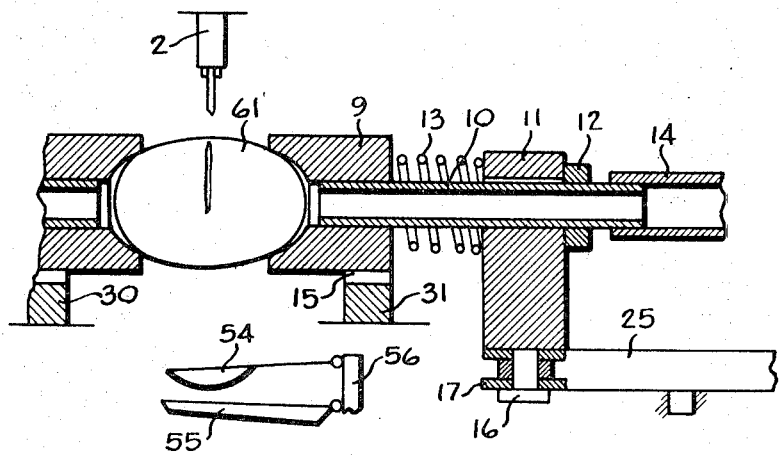
FIG. 2 shows a section through an egg vacuum holder in the first parallel guide track.

According to FIG. 2 the egg vacuum holders 3 each comprise a holding head 9, a tubular section 10, a bearing part 11 and a stop ring 12. The tubular section 10 is rigidly connected to the holding head 9 and both parts are positioned displaceably in the bearing part 11. An elastic element 13, for example, a pressure spring, is located between the bearing part 11 and the holding head 9. The stop ring 12 stops and limits the tubular section 11 and the holding head 9 in their movement. A flexible hose 11, leading in each case to the valve element follows the tubular section 11. The holding head 9 is recessed arched at its frontal side for the accommodation and positioning of part of the egg. At its lower section the holding head 9 is provided moreover with a serration 15 at the bottom part of its circular circumference which extends over part of the circumference.

Instead of using two spring elements 13 it is possible that only one egg vacuum holder of each pair might be equipped with a spring element, while the other egg vacuum holder is so designed that the egg nevertheless is securely positioned between the pair of holders. The task of the spring element consists in causing a perfect holding function of the holding heads, regardless of the different egg sizes.

The bearing part 11 is fastened at its lower end to a chain 17 via a bolt 16. The chain 17 rotates via rollers 18 and 19 (FIG. 1) and carries all right-hand vacuum holders of the holder pairs. The left-hand vacuum holders of the holder pairs are fastened to the chain 20 which rotates via the rollers 21 and 22. Both chains are perfectly synchronized in their operation, so that the left-hand and the right-hand vacuum holder of one pair of holders are precisely opposite of each other. Two guide rollers 23 and 24 and/or 25 and 26 each are located at the inner track of chains 17 and 20. As a result of these guide rollers the chains at first are guided parallel, then they operate between the two rollers 23 and 24 and/or 25 and 26 obliquely and flaringly apart from each other, and after passing the rollers 24 and 26 again operate parallel. Since the rollers 18 and 22 and the rollers 19 and 21 in each case have identical diameters and rotate at the same angular speed but in opposite directions (see arrows at rollers 19 and 21) the result is the exact required movement of chains 17 and 20.

The egg discharge means 4 comprises in each case an accommodation part 54 for the egg yolk, an accommodation part 55 located thereunder for the egg white. Both parts are under the spring effect and arranged at a beam 56 fastened to a chain 57. Said chain 57 rotates with the prevailing accommodation parts 54 and 55 via rollers 27, 28 and 29. Rollers 28 and 29 are placed coaxially with the rollers 18 and 19 of the right-hand vacuum holders and operate at the same speed as these. Thus one accommodation part for egg white and egg yolk is spaced below the track of chains 17 and 20 always precisely below one vacuum holder pair, so that it operates exactly in the same direction, synchronously and parallel with them.

Approximately at the end of the first parallel guide track there are two racks, 30 and 31 which can coact in each case with the serrated segment 15 of the holding heads 9 of the egg vacuum holders to cause rotation of the egg vacuum holders.

Figure 4:
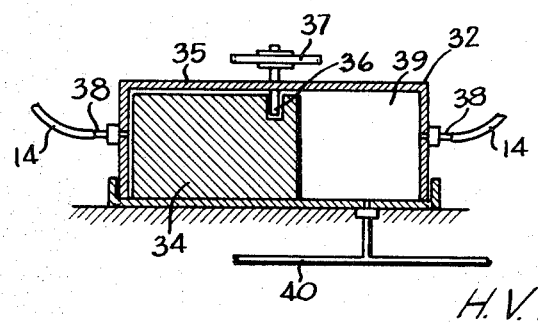
FIG. 4 shows a section through a valve element controlling the suction effect of one track of egg vacuum holders.

The control of the suction effect of the vacuum holders during their operating phase is accomplished by two valve elements 32 and 33, one being assigned to the left-hand, the other one to the right-hand vacuum holders. According to FIG. 4 such a valve element 32 comprises an approximately semi-circular fixedly arranged part 34 and a rotatable hollow-cylindrical jacket part 35. Said jacket part is positioned via a pin 36 in the stationary part 34 and provided with a chain wheel 37 propelled by the principal shaft 8 via a transmission and chain (not shown in detail). Bores and pipe threadings 38 are provided at the side walls which are connected to the flexible hose 14 of the vacuum holders. One flexible hose and one perforation in the side wall of the jacket portion is assigned to each vacuum holder. By covering the stationary part 34 with the jacket portion 35 a free enclosed inner area 39 is created. This internal area is connected with the suction side of a vacuum pump 41 via a pipe conduit 40. For good sealing between the solid or stationary part 34 and the jacket part 35 sealing elements 42 are provided at its lower end.

Via a pipe conduit 43 the pressure side of the vacuum pump 41 is connected with two compressed air nozzles 44 and 45 located above the egg vacuum holders in the area of the second parallel guide track. These compressed air nozzles are oriented obliquely (FIG. 3), so that the air jet impacts approximately the center of each egg shell half. Via a control the compressed air nozzles can be so operated that as the egg vacuum holders pass through one phase of operation they become effective.

The drive of the entire machines is accomplished from the principal shaft 8 connected via a sprocket wheel transmission, a gear, a belt drive or some similar device with the propulsion motor 46. Two worm gears 47 and 48 operating in opposite direction and propelling via worm wheels 49 and 50 the rollers 18 and 22 are placed on the main shaft. The roller 29 is placed coaxially to roller 18 and propelled in the same manner. However, possibilities of adjustment are provided in order to arrange the egg discharge means in the operating range precisely below the egg vacuum holder pairs and to compensate for any differences.

Furthermore, a sprocket wheel 51 is fastened to the principal shaft 51 propelling via an additional sprocket wheel 52 the egg feeding means. The chain wheels 37 of the valve elements 32 and 33 may be propelled from the vertical shafts via chain wheels and chains and with them the jacket parts 35 can be rotated in the same direction of rotation as rollers 19 and 21.

The machine for the preparation of eggs operates as follows:

The eggs are accommodated one by one by the transport rollers 6 of the egg feeding means and delivered to the vacuum holders. When pivoting into the first parallel guide track these vacuum holders are already under the influence of suction because the corresponding openings in the jacket 35 of the prevailing valve elements 32 and 33 are no longer covered by the stationary part 34. The egg 53 fed by the transport rollers is seized by a left and a right vacuum holder of one holding pair and due to the suction effect it is positioned between them safely and damage-free. Any differences in size are compensated by the spring elements 13 insofar as individual eggs are concerned. An accommodation part arrangement 54 of the egg discharge means moves in the same direction, parallel and synchronously below each pair of holders.

The egg, held by the egg holders moves along the first parallel path of the chain travel and is cracked by the separation means 2 which partially cracks the egg on the uppermost surface of the egg. The egg holders continue to move along the chain path and the serrated segments 15 engage the racks 30 and 31 causing rotation of the egg to the point where the cracked portion of the egg has rotated about 90° and is adjacent the leading edge of the egg. At this point the chains 17 and 20 pass the rollers 23 and 25 and begin to diverge obliquely apart. This causes the egg shell to be pulled apart under a slight bending movement which aids in cracking and completely separating the egg shell into two halves.

At the same time the segments 15 are disengaged from the racks 30 and 31 and due to the twisted flexible hose 14 they are turned back into their original position.

After separating the egg shell the contents of the egg drop now into arrangement 54 and 55 whereby the yolk is deposited into the accommodation part 54, while the white slides into accommodation part 55.

Figure 3:
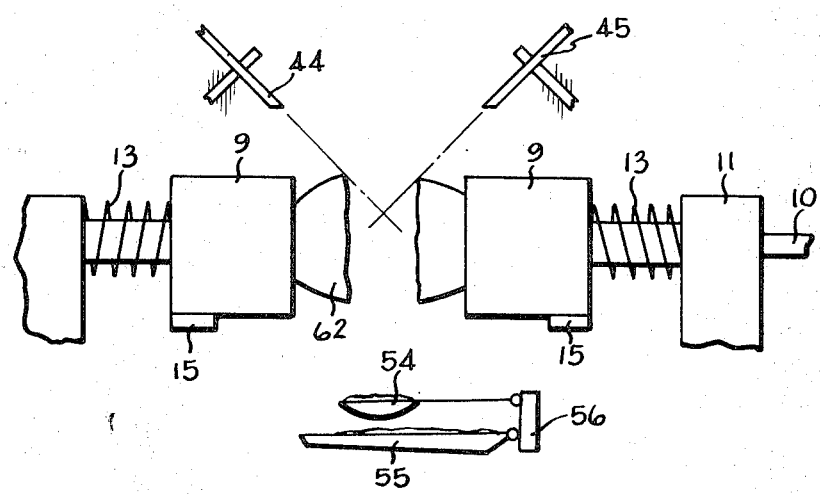
FIG. 3 shows a frontal view of an egg vacuum holding pair in the second parallel guide track with compressed air nozzles and egg discharge device.

With the aid of rollers 24 and 26 the chains 17 and 20 carrying egg vacuum holders are brought again into a second parallel guide track. In this area of the guide track the compressed air nozzles 44 and 45 now exert their influence upon the interior of each egg shell and thereby remove any remnants from the shell half or speed the emptying of the shell halves, freeing them from any egg content (FIG. 3).

With the operation continuing the left and right vacuum holder reach rollers 19 and 21. Approximately in the center of the roller the suction effect is eliminated due to covering of the perforations of the jacket part 35 by the stationary part 34 in the valve element 32 and 33, and the shell halves of the egg drop into the boxes 58 and 59.

The loaded accommodation parts 54 and 55 are conveyed via chain 57 to the accommodation tanks 60, 61 for egg white and egg yolk. With the aid of curved guides 62 and 63 at first the lower accommodation part 55 is pivoted away and the egg white drops into container 60, then the upper accommodation part 54 is pivoted, so that the egg yolk drops into container 61. This emptying may be followed by a cleaning of the accommodation parts 54 and 55.

After discontinuance of the suction effect the left and right vacuum holders meanwhile return on the outer side to the receiving place.

Under the constructive embodiment of the machine for egg preparation according to the invention it is immaterial whether the valve elements 32 and 33 are placed above or below the machine, whether the control is accomplished by magnetic valves or the like, or whether two or more compressed air nozzles are arranged above or below the egg vacuum holders.

By dividing the operations into many individual phases a plurality of eggs can be processed simultaneously and a high productive efficiency is accomplished. While for example egg 60 still is on the transport rollers 6 of the egg supply means 1, egg 53 already is held by one vacuum holder pair, egg 61 is partly opened, egg 62 is divided into two shell halves, egg 63 is completely emptied with its shell halves, and egg 64 is ready to be thrown with its shell halves. Meanwhile egg yolk and egg white are continuously removed from the preceding accommodation parts.

The result is a high productivity with simple and operationally safe subassemblies at low production and maintenance costs of the machine according to the invention.

I claim:

1. An egg handling machine comprising, means for delivering eggs, a plurality of opposed pairs of egg holders for receiving the eggs from the delivering means, means for selectively creating a vacuum in said egg holders, means for causing said egg holders to travel in a first generally parallel path, means for partially cutting said egg shells at locations above the bottom portions thereof while said eggs are traveling along said first parallel path, means for turning said egg holders and the partial cuts on said eggs downward while said eggs are traveling forwardly, and means for causing said egg holders to thereafter travel in oblique divergent paths while said eggs are gripped and turning so that said egg shells are pulled apart and releasing the contents thereof while turning, means for causing said egg holders to thereafter travel in a second generally parallel path, and means for receiving the contents of the eggs.

2. An egg handling machine in accordance with claim 1 wherein the pairs of egg holders are mounted on endless conveyors.

3. An egg handling machine in accordance with claim 1 wherein the means for receiving the contents of the eggs includes means for separating the whites and the yolks and means for selectively discharging the separated whites and yolks.

4. An egg handling apparatus in accordance with claim 3 wherein means are provided to direct a stream of compressed air into the cracked apart egg shell to assist in removal of the contents therefrom while said egg holders travel along said second generally parallel path.

5. An egg handling machine in accordance with claim 3 wherein means are provided for turning each pair of egg holders in a direction reverse to the direction turned after said partial cutting.